US012629970B2

(12) United States Patent
Zhang et al.

(10) Patent No.: US 12,629,970 B2
(45) Date of Patent: May 19, 2026

(54) PROGRAMMING METHOD AND DEVICE FOR TIRE PRESSURE SENSING DEVICE, AND REPLACEMENT METHOD AND DEVICE FOR TIRE PRESSURE SENSING DEVICE

(71) Applicant: Hamaton Automotive Technology Co., LTD, Hangzhou (CN)

(72) Inventors: Jianer Zhang, Hangzhou (CN); Haijun Ding, Hangzhou (CN); Mingguang Yu, Hangzhou (CN)

(73) Assignee: Hamaton Automotive Technology Co., Ltd, Hangzhou (CN)

( * ) Notice: Subject to any disclaimer, the term of this patent is extended or adjusted under 35 U.S.C. 154(b) by 330 days.

(21) Appl. No.: 18/254,804

(22) PCT Filed: Apr. 7, 2022

(86) PCT No.: PCT/CN2022/085620
§ 371 (c)(1),
(2) Date: May 26, 2023

(87) PCT Pub. No.: WO2023/159721
PCT Pub. Date: Aug. 31, 2023

(65) Prior Publication Data
US 2024/0316999 A1      Sep. 26, 2024

(30) Foreign Application Priority Data

Feb. 28, 2022    (CN) ........................ 202210183899.X

(51) Int. Cl.
B60C 23/04          (2006.01)
(52) U.S. Cl.
CPC ...... B60C 23/0471 (2013.01); B60C 23/0479 (2013.01)

(58) Field of Classification Search
CPC ........................ B60C 23/0471; B60C 23/0479
See application file for complete search history.

(56) References Cited

U.S. PATENT DOCUMENTS

2016/0013934 A1*    1/2016    Smereka ............... H04L 9/0891
                                                                        713/171
2020/0156422 A1    5/2020    Wang et al.
(Continued)

FOREIGN PATENT DOCUMENTS

CN          106739859 A        5/2017
CN          109308185 A        2/2019
(Continued)

OTHER PUBLICATIONS

International Search Report for International Application No. PCT/CN2022/085620, mailed Oct. 13, 2022, 7 pages with translation.

*Primary Examiner* — Quan Zhen Wang
*Assistant Examiner* — Rajsheed O Black-Childress
(74) *Attorney, Agent, or Firm* — TraskBritt

(57)          ABSTRACT

A replacement method for a tire pressure sensing device includes: requesting a server to obtain an installation program of a tire pressure sensing device for replacement; sending the installation program of the tire pressure sensing device to the tire pressure sensing device, where the installation program of the tire pressure sensing device is used to be installed and run in the tire pressure sensing device; requesting communication association rule from the server, where the communication association rule is used to write an authentication information of the tire pressure sensing device into a receiver corresponding to the tire pressure sensing device on a vehicle; and writing the authentication information of the tire pressure sensing device into the receiver corresponding to the tire pressure sensing device on the vehicle based on the communication association rule, (Continued)

and determining that the tire pressure sensing device is used legally.

13 Claims, 6 Drawing Sheets

(56)            References Cited

U.S. PATENT DOCUMENTS

2020/0361255 A1     11/2020   Lin et al.
2023/0256780 A1 *    8/2023   Houston ............ B60C 23/0471
                                                  701/29.4

FOREIGN PATENT DOCUMENTS

| CN | 110545322 A | 12/2019 | |
| CN | 112519515 A | 3/2021 | |
| CN | 112677713 A | 4/2021 | |
| WO | WO-2018126548 A1 * | 7/2018 | ......... B60C 23/0479 |

* cited by examiner

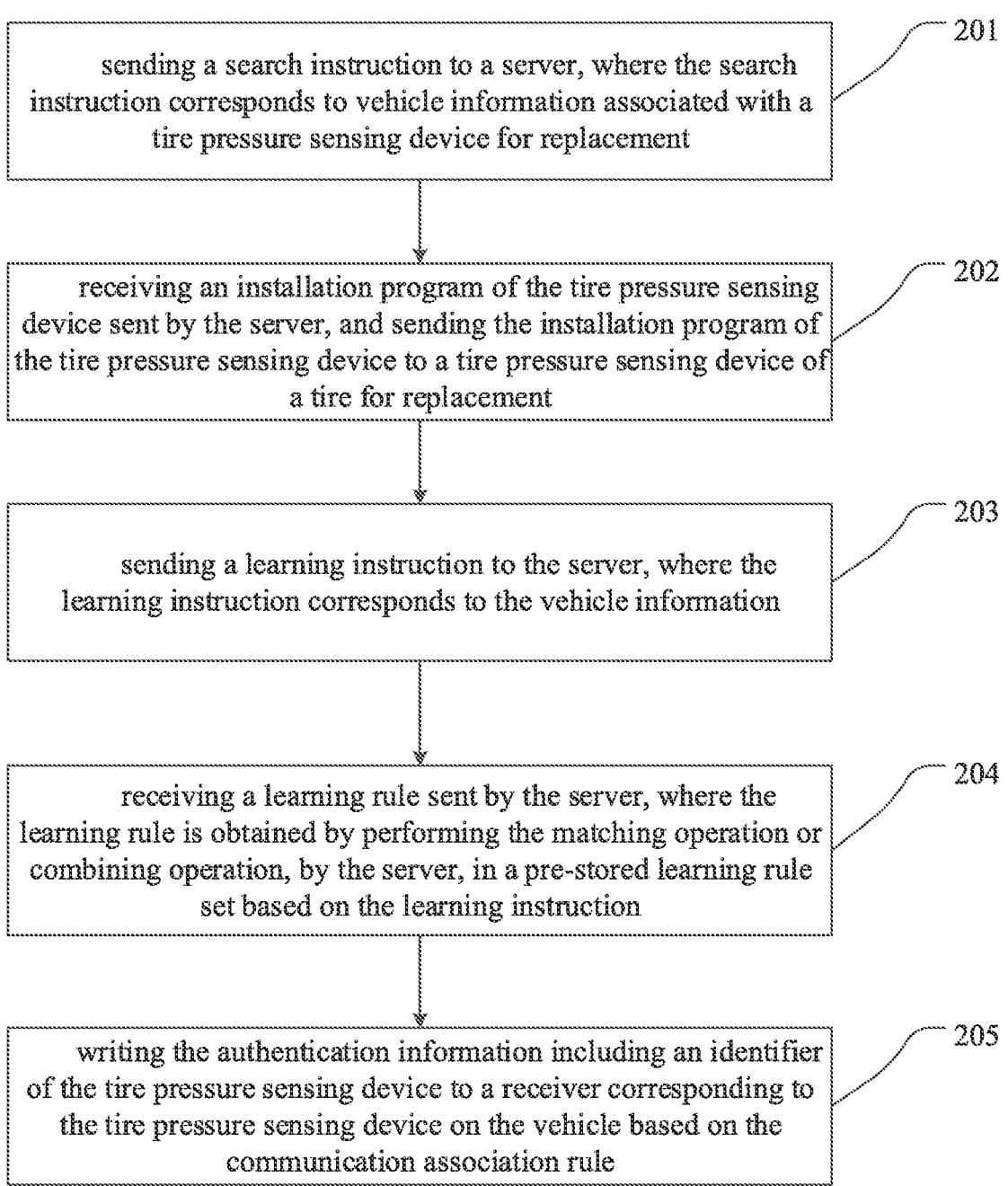

sending a search instruction to a server, where the search instruction corresponds to vehicle information associated with a tire pressure sensing device for replacement     201 receiving an installation program of the tire pressure sensing device sent by the server, and sending the installation program of the tire pressure sensing device to a tire pressure sensing device of a tire for replacement     202 sending a learning instruction to the server, where the learning instruction corresponds to the vehicle information     203 receiving a learning rule sent by the server, where the learning rule is obtained by performing the matching operation or combining operation, by the server, in a pre-stored learning rule set based on the learning instruction     204 writing the authentication information including an identifier of the tire pressure sensing device to a receiver corresponding to the tire pressure sensing device on the vehicle based on the communication association rule     205

FIG. 2

Installation program obtaining
and sending module 40

Authentication
information writing module 41

First querying and sending
module 50

Second querying and
sending module 51

Cloud server 101

Intelligent terminal
102

Tire pressure
sensing device 103

Tire pressure
sensing device 103

......

Tire pressure
sensing device 103

PROGRAMMING METHOD AND DEVICE FOR TIRE PRESSURE SENSING DEVICE, AND REPLACEMENT METHOD AND DEVICE FOR TIRE PRESSURE SENSING DEVICE

CROSS-REFERENCE TO RELATED APPLICATIONS

This application is a national phase entry under 35 U.S.C. § 371 of International Patent Application PCT/CN2022/085620, filed Apr. 7, 2022, designating the United States of America, which claims the benefit under Article 8 of the Patent Cooperation Treaty to Chinese Patent Application Serial No. 202210183899X, filed Feb. 28, 2022.

TECHNICAL FIELD

The present application relates to the field of tire pressure sensing technologies, in particular, to a programming method and device for tire pressure sensing device, and a replacement method and device for tire pressure sensing device.

BACKGROUND

Tire pressure monitoring system (TPMS) refers to an auxiliary safety system mounted on vehicle tires for monitoring tire pressure in real time. By mounting high-sensitive tire pressure sensing devices with transceiver function on each vehicle tire, tire pressure, tire temperature and other data of vehicle tires can be monitored in real time when the vehicle is running or is sitting still, and the monitored data can be wirelessly transmitted to an external controller. When the tire is leaking or has a low tire pressure, it will alarm to ensure that the user can drive safely. Tires are wearing components and shall be replaced after several years of use. In general, a new tire pressure sensing device will be used at the same time.

At present, tire pressure sensing devices used widely in aftermarket are mainly those with modifiable manufacturer's code. When this type of tire pressure sensing devices is used for replacement, the programming for them needs to be carried out in professional service shop using professional equipment.

There are the following disadvantages in the related art:

(1) The programming needs to be carried out in professional service shop using professional equipment, so it's expensive and inconvenient to replace the tire pressure sensing devices.

(2) Users cannot replace the tire pressure sensing devices by themselves because they lack expensive professional equipment and also lack specialized knowledge about that.

Furthermore, even if the programming for tire pressure sensing device is solved, an added problem for those skilled in the art is to successfully collect the data monitored by the tire pressure sensing device through vehicle related control system and transmit the monitored data to a mobile terminal that is convenient for users to view.

BRIEF SUMMARY

The present application provides a programming method and device for tire pressure sensing device, and a replacement method and device for tire pressure sensing device, to overcome the defect of high cost for programming the tire pressure sensing device when replacing tire in the related art, and reduce the maintenance cost for replacing tire pressure sensing device, which is simple to operate and easy to promote.

The present application provides a programming method for tire pressure sensing device, including: requesting a server to obtain an installation program of a tire pressure sensing device for replacement; and sending the installation program of the tire pressure sensing device to the tire pressure sensing device, where the installation program of the tire pressure sensing device is used to be installed and run in the tire pressure sensing device.

In an embodiment, the installation program of the tire pressure sensing device for replacement is obtained by following steps: sending a search instruction to the server, where the search instruction corresponds to vehicle information associated with a tire pressure sensing device for replacement, and receiving the installation program of the tire pressure sensing device sent by the server, where the installation program of the tire pressure sensing device is obtained by performing the matching operation, by the server, or combining in a pre-stored installation program set for a tire pressure sensing device based on the search instruction.

In an embodiment, the installation program of the tire pressure sensing device being obtained by performing the matching operation, by the server, in the pre-stored installation program set for a tire pressure sensing device based on the search instruction includes: determining, by the server, a code corresponding to the search instruction; and matching the code with an installation program set for a tire pressure sensing device pre-stored in special programming database based on a preset logic, and obtaining the installation program of the tire pressure sensing device matching with the vehicle information.

In an embodiment, the installation program of the tire pressure sensing device being obtained by performing the combining operation, by the server, in the pre-stored installation program set for a tire pressure sensing device based on the search instruction includes: determining, by the server, a code corresponding to the search instruction; querying a plurality of installation programs associated with the code in an installation program set for a tire pressure sensing device pre-stored in special programming database; and the server combines the plurality of installation programs based on a preset logic to form the installation program of the tire pressure sensing device matching with the vehicle information.

The present application further provides a programming device for tire pressure sensing device, including: an installation program obtaining module and a first installation program sending module. The installation program obtaining module is used to request a server to obtain an installation program of a tire pressure sensing device for replacement. The first installation program sending module is used to send the installation program of the tire pressure sensing device to the tire pressure sensing device, where the installation program of the tire pressure sensing device is used to be installed and run in the tire pressure sensing device.

The present application further provides a programming method for tire pressure sensing device, including: querying an installation program of the tire pressure sensing device for replacement based on a request of an intelligent terminal; and sending the installation program of the tire pressure sensing device to the intelligent terminal, where the installation program of the tire pressure sensing device is used to be installed and run in the tire pressure sensing device after being sent to the tire pressure sensing device through the intelligent terminal.

In an embodiment, the installation program of the tire pressure sensing device for replacement is obtained by following steps: receiving a search instruction sent by the intelligent terminal, where the search instruction corresponds to vehicle information associated with a tire pressure sensing device for replacement; and obtaining the installation program of the tire pressure sensing device matching with the search instruction from a pre-stored installation program set for a tire pressure sensing device.

In an embodiment, the obtaining the installation program of the tire pressure sensing device matching with the search instruction from the pre-stored installation program set for a tire pressure sensing device includes: determining a code corresponding to the search instruction; and matching the code with an installation program set for a tire pressure sensing device pre-stored in special programming database based on a preset logic and obtaining the installation program of the tire pressure sensing device matching with the code.

In an embodiment, the obtaining the installation program of the tire pressure sensing device matching with the search instruction from the pre-stored installation program set for a tire pressure sensing device includes: determining a code corresponding to the search instruction; querying a plurality of installation programs associated with the code in an installation program set for a tire pressure sensing device pre-stored in special programming database; and combining the plurality of installation programs based on a preset logic to form the installation program of the tire pressure sensing device matching with the code.

The present application further provides a programming device for tire pressure sensing device, including: an installation program querying module and a second installation program sending module. The installation program querying module is used to query an installation program of the tire pressure sensing device for replacement based on a request of an intelligent terminal. The second installation program sending module is used to send the installation program of the tire pressure sensing device to the intelligent terminal, where the installation program of the tire pressure sensing device is used to be installed and run in the tire pressure sensing device after being sent to the tire pressure sensing device through the intelligent terminal.

The present application further provides a replacement method for tire pressure sensing device, including: requesting a server to obtain an installation program of a tire pressure sensing device for replacement; sending the installation program of the tire pressure sensing device to the tire pressure sensing device, where the installation program of the tire pressure sensing device is used to be installed and run in the tire pressure sensing device; and requesting the server for communication association rule, where the communication association rule is used to write an authentication information of the tire pressure sensing device into a receiver corresponding to the tire pressure sensing device on a vehicle; and writing the authentication information of the tire pressure sensing device into the receiver corresponding to the tire pressure sensing device on the vehicle based on the communication association rule, and determining that the tire pressure sensing device is used legally.

In an embodiment, the installation program of the tire pressure sensing device for replacement is obtained by following steps: sending a search instruction to the server, where the search instruction corresponds to vehicle information associated with a tire pressure sensing device for replacement, and receiving the installation program of the tire pressure sensing device sent by the server, where the installation program of the tire pressure sensing device is obtained by performing the matching operation, by the server, or combining in a pre-stored installation program set for a tire pressure sensing device based on the search instruction.

In an embodiment, the communication association rule is obtained by following steps: sending a learning instruction to the server, where the learning instruction corresponds to the vehicle information; and receiving a learning rule sent by the server, where the learning rule is obtained by performing the matching operation, by the server, or combining in a pre-stored learning rule set based on the learning instruction, and the learning rule includes the communication association rule matching with the vehicle information.

In an embodiment, the writing the authentication information of the tire pressure sensing device into the receiver corresponding to the tire pressure sensing device on the vehicle based on the communication association rule includes: writing the authentication information including an identifier of the tire pressure sensing device into the receiver corresponding to the tire pressure sensing device on the vehicle based on the communication association rule.

In an embodiment, the communication association rule includes communication rule, communication method and access authority matching with the vehicle information.

In an embodiment, the installation program of the tire pressure sensing device being obtained by performing the matching operation, by the server, in the pre-stored installation program set for a tire pressure sensing device based on the search instruction includes: determining, by the server, a code corresponding to the search instruction; and matching the code with an installation program set for a tire pressure sensing device pre-stored in special programming database based on a preset logic, and obtaining the installation program of the tire pressure sensing device matching with the vehicle information.

In an embodiment, the installation program of the tire pressure sensing device being obtained by performing the combining operation, by the server, in the pre-stored installation program set for a tire pressure sensing device based on the search instruction includes: determining, by the server, a code corresponding to the search instruction; the server queries a plurality of installation programs associated with the code in an installation program set for a tire pressure sensing device pre-stored in special programming database; and combining the plurality of installation programs based on a preset logic to form the installation program of the tire pressure sensing device matching with the vehicle information.

In an embodiment, the sending the installation program of the tire pressure sensing device to a tire pressure sensing device of a tire for replacement includes: sending the installation program of the tire pressure sensing device to the tire pressure sensing device of the tire for replacement by wireless.

In an embodiment, the writing the authentication information including the identifier of the tire pressure sensing device into the receiver corresponding to the tire pressure sensing device on the vehicle includes: writing the authentication information into the receiver corresponding to the tire pressure sensing device on the vehicle through OBD wireless transceiver by wireless.

In an embodiment, the obtaining of the learning rule by performing the matching operation includes: the server determines a code corresponding to the learning instruction; and the server matches the code with the pre-stored learning rule set based on a preset logic to obtain the learning rule matching with the vehicle information.

In an embodiment, the obtaining of the learning rule by performing the combining operation includes: the server determines a code corresponding to the learning instruction; the server queries a plurality of learning rules associated with the code in the pre-stored learning rule set; and the server combines the plurality of learning rules based on a preset logic to form the learning rule matching with the vehicle information.

The present application further provides an intelligent terminal with a replacement device for tire pressure sensing device, including:

an installation program obtaining and sending module, used to request a server to obtain an installation program of a tire pressure sensing device for replacement; and send the installation program of the tire pressure sensing device to the tire pressure sensing device, where the installation program of the tire pressure sensing device is used to be installed and run in the tire pressure sensing device; and an authentication information writing module, used to request a communication association rule from the server, where the communication association rule is used to write an authentication information of the tire pressure sensing device into a receiver corresponding to the tire pressure sensing device on a vehicle; and write the authentication information of the tire pressure sensing device into the receiver corresponding to the tire pressure sensing device on the vehicle based on the communication association rule, and determine that the tire pressure sensing device is used legally.

The present application further provides a replacement method for tire pressure sensing device, including:

querying an installation program of the tire pressure sensing device for replacement based on a request of an intelligent terminal; and sending the installation program of the tire pressure sensing device to the intelligent terminal, where the installation program of the tire pressure sensing device is used to be installed and run in the tire pressure sensing device after being sent to the tire pressure sensing device through the intelligent terminal; and querying communication association rule based on the request of the intelligent terminal, where the communication association rule is used to write an authentication information of the tire pressure sensing device into a receiver corresponding to the tire pressure sensing device on the vehicle; and sending the communication association rule to the intelligent terminal, to enable the intelligent terminal to write the authentication information into the receiver corresponding to the tire pressure sensing device on the vehicle based on the communication association rule and determine that the tire pressure sensing device is used legally.

In an embodiment, the installation program of the tire pressure sensing device for replacement is obtained by following steps: receiving a search instruction sent by the intelligent terminal, where the search instruction corresponds to vehicle information associated with a tire pressure sensing device for replacement; and obtaining the installation program of the tire pressure sensing device matching with the search instruction from a pre-stored installation program set for a tire pressure sensing device.

In an embodiment, the communication association rule is obtained by following steps: receiving a learning instruction sent by the intelligent terminal, where the learning instruction corresponds to the vehicle information; and obtaining a learning rule matching with the learning instruction from a pre-stored learning rule set, where the learning rule includes the communication association rule corresponding to the vehicle information.

In an embodiment, the communication association rule includes communication rule, communication method and access authority matching with the vehicle information.

In an embodiment, the obtaining the installation program of the tire pressure sensing device matching with the search instruction from a pre-stored installation program set for a tire pressure sensing device includes: determining a code corresponding to the search instruction; and matching the code with an installation program set for a tire pressure sensing device pre-stored in special programming database based on a preset logic, and obtaining the installation program of the tire pressure sensing device matching with the code.

In an embodiment, the obtaining the installation program of the tire pressure sensing device matching with the search instruction from a pre-stored installation program set for a tire pressure sensing device includes: determining a code corresponding to the search instruction; querying a plurality of installation programs associated with the code in an installation program set for a tire pressure sensing device pre-stored in special programming database; and combining the plurality of installation programs based on a preset logic to form the installation program of the tire pressure sensing device matching with the code.

In an embodiment, the obtaining of the learning rule by performing the matching operation includes: the server determines a code corresponding to the learning instruction; and the server matches the code with the pre-stored learning rule set based on a preset logic to obtain the learning rule matching with the vehicle information.

In an embodiment, the obtaining of the learning rule by performing the combining operation includes: the server determines a code corresponding to the learning instruction; the server queries a plurality of learning rules associated with the code in the pre-stored learning rule set; and the server combines the plurality of learning rules based on a preset logic to form the learning rule matching with the vehicle information.

The present application further provides a server with a replacement device for tire pressure sensing device, including:

a first querying and sending module, used to query an installation program of the tire pressure sensing device for replacement based on a request of an intelligent terminal; and send the installation program of the tire pressure sensing device to the intelligent terminal, where the installation program of the tire pressure sensing device is used to be installed and run in the tire pressure sensing device after being sent to the tire pressure sensing device through the intelligent terminal; and a second querying and sending module, used to query communication association rule based on the request of the intelligent terminal, where the communication association rule is used to write an authentication information of the tire pressure sensing device into a receiver corresponding to the tire pressure sensing device on the vehicle; and send the communication association rule to the intelligent terminal, to enable the intelligent terminal to write the authentication information into the receiver corresponding to the tire pressure sensing device on the vehicle based on the communication association rule and determine that the tire pressure sensing device is used legally.

The present application further provides a replacement system for tire pressure sensing device, including: an intelligent terminal, a server and a tire pressure sensing device, where the intelligent terminal includes a processor and a memory storing computer programs, and the computer programs, when executed by the processor, cause the processor to perform any of the above replacement methods for tire pressure sensing device; the server includes a processor and a memory storing computer programs, where the computer programs, when executed by the processor, cause the processor to perform any of the above replacement methods for tire pressure sensing device; and the tire pressure sensing device is used to run an installation program of the tire pressure sensing device.

The present application further provides an electronic device, including a processor and a memory storing computer programs, where the computer programs, when executed by the processor, cause the processor to perform any of the above replacement methods for tire pressure sensing device.

The present application further provides a non-transient computer readable storage medium, storing computer programs, where the computer programs, when executed by a processor, cause the processor to perform any of the above replacement methods for tire pressure sensing device.

The present application further provides a computer program product, including computer programs, where the computer programs, when executed by a processor, cause the processor to perform any of the above replacement methods for tire pressure sensing device.

Based on the programming method for tire pressure sensing device and the related devices in the present application, after purchasing tire pressure sensing device, users can install relevant applications (APPs) in the intelligent terminal and download the installation program of the tire pressure sensing device for replacement from the remote server, and then after the user obtains the installation program of the tire pressure sensing device for replacement through the intelligent terminal, the user sends it to the tire pressure sensing device. After obtaining the installation program, the tire pressure sensing device loads and runs the program.

Based on the present application, regarding the programming for tire pressure sensing device, it is not necessary to go to a professional service shop to perform the replacement by professional staff using professional equipment when replacing the tire pressure sensing device. Tire maintenance providers or vehicle maintenance providers can do programming job without professional equipment, and the individual users can download APPs in smart phones or smart tablets, purchase tire pressure sensing device from e-commerce platform or auto parts store, and replace the failed tire pressure sensing device on the vehicle by themselves, thus greatly reducing the costs of use and maintenance.

Based on the replacement method for tire pressure sensing device and the related devices in the present application, after purchasing the tire pressure sensing device, users install relevant APPs in the intelligent terminal, and download the installation program of the tire pressure sensing device for replacement and communication association rule from the remote server. On the one hand, after obtaining the installation program of the tire pressure sensing device for replacement through the intelligent terminal, users send it to the tire pressure sensing device, and after obtaining the installation program, the tire pressure sensing device loads and runs the program. On the other hand, based on the obtained communication association rule, the authentication information (including identifier) of the tire pressure sensing device is written into the receiver corresponding to the tire pressure sensing device on the vehicle, and the tire pressure sensing device is determined to be used legally through a certification of the receiver.

In the present application, in addition the tire maintenance providers or vehicle maintenance providers can do programming job without professional equipment, the tire pressure sensing device can collect data being monitored smoothly through the relevant control system of the vehicle and send the collected data to the mobile terminal by which users can view conveniently, so it is convenient for users to collect tire related parameters.

In the present application, the defect of high cost for replacing tire pressure sensing device when replacing tire in the related art is overcome through information interaction between intelligent terminal, server (such as cloud server) and tire pressure sensing device, and the cost for replacing tire pressure sensing device is reduced, which is simple to operate and easy to promote.

BRIEF DESCRIPTION OF THE DRAWINGS

In order to clearly illustrate the solutions according to the embodiments of the present application or the related art, the accompanying drawings used in the description of the embodiments or the related art are briefly introduced below. It should be noted that the drawings in the following description are only some embodiments of the present application. For those of ordinary skill in the art, other drawings can be obtained according to these drawings without creative efforts.

FIG. 2 is a schematic flow diagram of a replacement method for tire pressure sensing device applied to intelligent terminal according to another embodiment of the present application;

DETAILED DESCRIPTION

Figure 1:
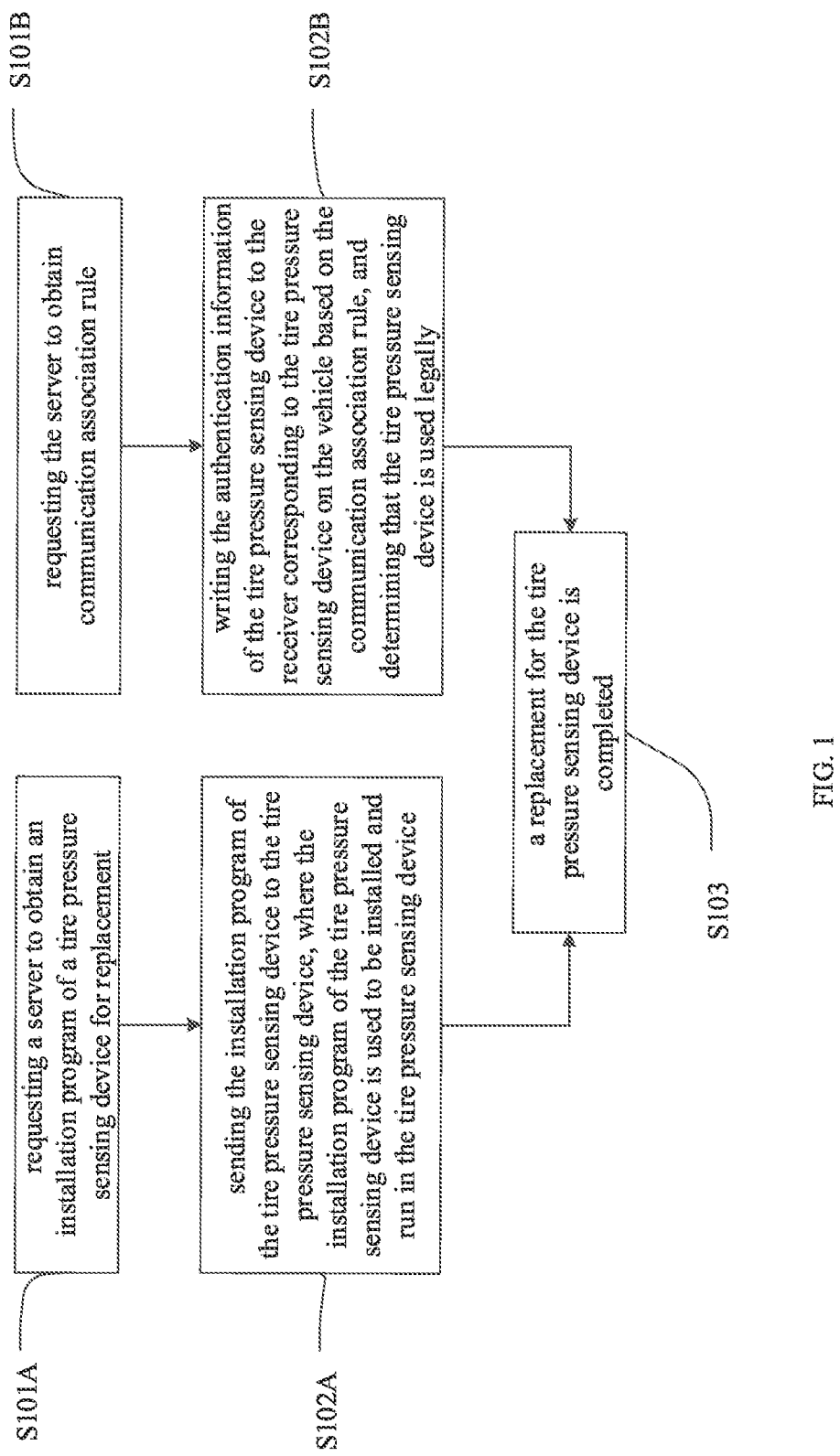
FIG. 1 is a schematic flow diagram of a replacement method for tire pressure sensing device applied to intelligent terminal according to an embodiment of the present application.

In order to make the objectives, solutions and advantages of the present application clearer, the solutions of the present application are clearly and completely described below. It should be noted that the embodiments described below are a part of the embodiments of the present application, but not all the embodiments. Based on the embodiments of the present application, all other embodiments obtained by those of ordinary skill in the art without creative efforts are within the scope of protection of the present application.

In the present application, the defect of high cost for replacing tire pressure sensing device when replacing tire in the related art is overcome through information interaction between intelligent terminal, server (such as cloud server) and tire pressure sensing device, and the cost for replacing tire pressure sensing device is reduced, which is simple to operate and easy to promote.

For example, the implementation of the present application relies on the intelligent terminal, server and tire pressure sensing device as well as the interaction of information between them. The information processing schemes are illustrated below from perspectives of intelligent terminal and server.

It should be noted that the intelligent terminal in the present application can be mobile phone, tablet computer, laptop, or other mobile electronic devices with data processing function and being able to interact with users in information, or can be personal computer (PC), which is not limited in the present application.

The present application provides an embodiment of a programming method for tire pressure sensing device, where the method is applied to an intelligent terminal and includes the following steps:

step a, requesting a server to obtain an installation program of a tire pressure sensing device for replacement; and step b, sending the installation program of the tire pressure sensing device to the tire pressure sensing device, where the installation program of the tire pressure sensing device is used to be installed and run in the tire pressure sensing device.

Based on this embodiment, after purchasing the tire pressure sensing device, users install relevant applications (APPs) in the intelligent terminal, and download the installation program of the tire pressure sensing device for replacement from a remote server, and after obtaining the installation program of the tire pressure sensing device for replacement through the intelligent terminal, the users send it to the tire pressure sensing device. After receiving the installation program, the tire pressure sensing device loads and runs the program.

Based on this embodiment, regarding the programming for tire pressure sensing device, it is not necessary to go to a professional service shop to perform the replacement by professional staff using professional equipment when replacing the tire pressure sensing device. Tire maintenance providers or vehicle maintenance providers can do programming job without professional equipment, and the individual users can download APPs in smart phones or smart tablets, purchase tire pressure sensing device from e-commerce platform or auto parts store, and replace the failed tire pressure sensing device on the vehicle by themselves, thus greatly reducing the costs of use and maintenance.

In an embodiment, the scheme of obtaining the installation program of the tire pressure sensing device for replacement is illustrated in detail in the following embodiments of replacement method for tire pressure sensing device, and they can be referenced with each other, which are not repeated here.

The present application further provides a programming device for tire pressure sensing device, and the programming device includes an installation program obtaining module and a first installation program sending module. The installation program obtaining module is used for requesting a server to obtain an installation program of a tire pressure sensing device for replacement, and the first installation program sending module is used for sending the installation program of the tire pressure sensing device to the tire pressure sensing device, where the installation program of the tire pressure sensing device is used to be installed and run in the tire pressure sensing device. The installation program obtaining module and first installation program sending module are further involved in the embodiment of FIG. 4 below, which can be referenced with the installation program obtaining and sending module 40 and are not repeated here.

The present application further provides an embodiment of a programming method for tire pressure sensing device, where the method is applied to a server and includes the following steps:

step c, querying an installation program of the tire pressure sensing device for replacement based on a request of an intelligent terminal;

step d, sending the installation program of the tire pressure sensing device to the intelligent terminal, where the installation program of the tire pressure sensing device is used to be installed and run in the tire pressure sensing device after being sent to the tire pressure sensing device through the intelligent terminal.

In an embodiment, the scheme of obtaining the installation program of the tire pressure sensing device for replacement is illustrated in detail in the following embodiments of replacement method for tire pressure sensing device, and they can be referenced with each other, which are not repeated here.

The present application further provides another programming device for tire pressure sensing device, and the programming device includes an installation program querying module and a second installation program sending module. The installation program querying module is used for querying an installation program of the tire pressure sensing device for replacement based on a request of an intelligent terminal, and the second installation program sending module is used for sending the installation program of the tire pressure sensing device to the intelligent terminal, where the installation program of the tire pressure sensing device is used to be installed and run in the tire pressure sensing device after being sent to the tire pressure sensing device through the intelligent terminal. The installation program querying module and second installation program sending module are further involved in the embodiment of FIG. 5 below, which can be referenced with the first querying and sending module 50 and are not repeated here.

The present application provides an embodiment of a replacement method for tire pressure sensing device. In this embodiment, the method is applied to an intelligent terminal and includes the following steps:

step 1, requesting a server to obtain an installation program of a tire pressure sensing device for replacement; and sending the installation program of the tire pressure sensing device to the tire pressure sensing device, where the installation program of the tire pressure sensing device is used to be installed and run in the tire pressure sensing device; and step 2, requesting the server for communication association rule, where the communication association rule is used to write an authentication information of the tire pressure sensing device into a receiver corresponding to the tire pressure sensing device on a vehicle; and writing the authentication information of the tire pressure sensing device into the receiver corresponding to the tire pressure sensing device on the vehicle based on the communication association rule, and determining that the tire pressure sensing device is used legally.

Through the step 1, after the installation program of the tire pressure sensing device is installed and run in the tire pressure sensing device, the tire pressure sensing device can collect tire related parameters through a control of the intelligent terminal, such as tire pressure, temperature, acceleration and the like.

However, the completion of step 1 cannot enable the relevant control equipment on the vehicle to which the tires belong to identify the above collected parameters. In an embodiment, the vehicle control system can identify the parameters obtained by the tire pressure sensing device (such as tire pressure, temperature, acceleration and the like) only after the authentication information is written through the step 2. And then these parameters can be transmitted to user mobile terminal equipment by the relevant control equipment on the vehicle, and can be displayed by the display equipment of intelligent terminal.

The following points should be highlighted.

First, in the embodiment of the present application, two data are obtained from the server, namely the installation program of the tire pressure sensing device for replacement and the communication association rule. It should be noted that there is no chronological restriction when obtaining the two data. For example, the installation program of the tire pressure sensing device for replacement is obtained first, and then the communication association rule is obtained; or the communication association rule is obtained first, and then the installation program of the tire pressure sensing device for replacement is obtained. The present application does not limit the chronological order when obtaining the two data.

Second, this method includes two operations:

operation 1: sending the installation program of the tire pressure sensing device to the tire pressure sensing device, where the installation program of the tire pressure sensing device is used to be installed and run in the tire pressure sensing device; and operation 2: writing the authentication information of the tire pressure sensing device to the receiver corresponding to the tire pressure sensing device on the vehicle based on the communication association rule, and determining that the tire pressure sensing device is used legally.

From a perspective of execution time, there is no clear order between operation 1 and operation 2. For example, the operation 1 is executed first, and then the operation 2 is executed; or the operation 2 is executed first, and then the operation 1 is executed.

Through the operation 1, the tire pressure sensing device can collect tire related parameters through a control of the intelligent terminal, such as tire pressure, temperature, acceleration and the like.

Through the operation 2, after the authentication information is written, the vehicle control system can identify the parameters collected by the tire pressure sensing device, such as tire pressure, temperature, acceleration and the like. And then these parameters can be transmitted to user mobile terminal equipment by the relevant control equipment on the vehicle, and can be displayed by the display equipment of intelligent terminal.

It can be seen that, due to the inevitable limitation of literal description, although the operation 1 is written before the operation 2, it is not a limitation on the implementation of the present application. Whether the operation 1 is executed first or the operation 2 is executed first is within the protection scope of the present application.

Third, it should be noted that, in actual implementation, the following four events are executed:

obtaining the installation program of the tire pressure sensing device for replacement;

obtaining the communication association rule;

the operation 1; and the operation 2.

The execution order of the above four events is not limited in the present application, but two conditions must be satisfied:

1) before executing the operation 1, the installation program of the tire pressure sensing device for replacement has been obtained; and 2) before executing the operation 2, the communication association rule has been obtained.

It is not necessary to obtain the communication association rule before executing the operation 1, and it is not necessary to obtain the installation program of the tire pressure sensing device for replacement before executing the operation 2.

Referring to FIG. 1, FIG. 1 is a schematic flow diagram of a replacement method for tire pressure sensing device of the present application, where the replacement method is applied to an intelligent terminal and includes the following operations.

One of the operations is:

step 101A, requesting a server to obtain an installation program of a tire pressure sensing device for replacement; and step 102A, sending the installation program of the tire pressure sensing device to the tire pressure sensing device, where the installation program of the tire pressure sensing device is used to be installed and run in the tire pressure sensing device.

Another of the operations is:

step 101B, requesting the server to obtain communication association rule, where the communication association rule is used to write an authentication information of the tire pressure sensing device into a receiver corresponding to the tire pressure sensing device on a vehicle;

step 102B, writing the authentication information of the tire pressure sensing device to the receiver corresponding to the tire pressure sensing device on the vehicle based on the communication association rule, and determining that the tire pressure sensing device is used legally; and step 103, a replacement for the tire pressure sensing device is completed.

It can be seen from FIG. 1 that the operation including step 101A and step 102A and the operation including step 101B and step 102B are different operations in two aspects, and there is no inevitable requirement for the execution time sequence of the operations in two aspects.

After the operations in two aspects are successfully executed, step 103 can be executed, and then the monitoring information collected by the tire pressure sensing device can be obtained, such as tire pressure, acceleration, temperature and the like.

Referring to FIG. 2, FIG. 2 shows a schematic flow diagram of a replacement method for tire pressure sensing device based on another embodiment of the present application, and the replacement method includes:

step 201, sending a search instruction to a server, where the search instruction corresponds to vehicle information associated with a tire pressure sensing device for replacement;

step 202, receiving an installation program of the tire pressure sensing device sent by the server, and sending the installation program of the tire pressure sensing device to a tire pressure sensing device of a tire for replacement, where the installation program of the tire pressure sensing device is obtained by performing the matching operation, by the server, or combining in a pre-stored installation program set for a tire pressure sensing device based on the search instruction;

step 203, sending a learning instruction to the server, where the learning instruction corresponds to the vehicle information;

step 204, receiving a learning rule sent by the server, where the learning rule is obtained by performing the matching operation or combining operation, by the server, in a pre-stored learning rule set based on the learning instruction, and the learning rule includes communication association rule matching with the vehicle information; and step 205, writing the authentication information including an identifier of the tire pressure sensing device to a receiver corresponding to the tire pressure sensing device on the vehicle based on the communication association rule.

In an embodiment, the authentication information includes the identifier of the tire pressure sensing device.

In an embodiment, the communication association rule can include communication rule, communication method and access authority matching with the vehicle information.

In an embodiment, the server can obtain the installation program of the tire pressure sensing device through matching in the pre-stored installation program set for a tire pressure sensing device through the following steps:

step 1a, the server determines a code corresponding to the search instruction; and step 1b, matching the code with an installation program set for a tire pressure sensing device pre-stored in special programming database based on a preset logic to obtain the installation program of the tire pressure sensing device matching with the vehicle information.

In an embodiment, the server can obtain the installation program of the tire pressure sensing device through combining in the pre-stored installation program set for a tire pressure sensing device through the following steps:

step 2a, the server determines a code corresponding to the search instruction;

step 2b, querying a plurality of installation programs associated with the code in an installation program set for a tire pressure sensing device pre-stored in special programming database; and step 2c: combining the plurality of installation programs based on a preset logic to form the installation program of the tire pressure sensing device matching with the vehicle information.

The difference between the above two methods of obtaining installation program of the tire pressure sensing device is that the installation program of the tire pressure sensing device is obtained by directly matching or by combining. The present application is not limited by the above two methods, and the solution of obtaining installation program of the tire pressure sensing device is within the protection scope of the present application in case the installation program of the tire pressure sensing device is obtained based on the code corresponding to the search instruction.

In an embodiment, the learning rule can be obtained by performing the matching operation, by the server, including:

step 3a, the server determines a code corresponding to the learning instruction; and step 3b, matching the code with the pre-stored learning rule set to obtain the learning rule matching with the vehicle information based on a preset logic.

In an embodiment, the learning rule can be obtained by performing the combining operation, by the server, including:

step 4a, the server determines a code corresponding to the learning instruction;

step 4b, querying a plurality of learning rules associated with the code in the pre-stored learning rule set; and step 4c, combining the plurality of learning rules to form the learning rule matching with the vehicle information based on a preset logic.

In an embodiment, sending the installation program of the tire pressure sensing device to the tire pressure sensing device of the tire for replacement includes: sending the installation program of the tire pressure sensing device to the tire pressure sensing device on the tire for replacement by wireless.

In an embodiment, writing the authentication information including the identifier of the tire pressure sensing device to the receiver corresponding to the tire pressure sensing device on the vehicle includes: writing the authentication information to the receiver corresponding to the tire pressure sensing device on the vehicle through on-board diagnostics (OBD) wireless transceiver 104 by wireless.

Based on the present application, after purchasing the tire pressure sensing device, users install relevant APPs in the intelligent terminal, and download the installation program of the tire pressure sensing device for replacement and communication association rule from the remote server. On the one hand, after obtaining the installation program of the tire pressure sensing device for replacement through the intelligent terminal, users send it to the tire pressure sensing device, and after obtaining the installation program, the tire pressure sensing device loads and runs the program. On the other hand, based on the obtained communication association rule, the authentication information (including identifier) of the tire pressure sensing device is written into the receiver corresponding to the tire pressure sensing device on the vehicle, and the tire pressure sensing device is determined to be used legally through a certification of the receiver.

It can be seen from the above analysis that, based on the present application, it is not necessary to go to a professional service shop to learn how to match the vehicle with the tire pressure sensing device, or to ask professional staff to replace the programming of the tire pressure sensing device using professional equipment when replacing the tire pressure sensing device. Tire maintenance providers or vehicle maintenance providers can do programming job without professional equipment, and the individual users can download APPs in smart phones or smart tablets, purchase tire pressure sensing device from e-commerce platform or auto parts store, and replace the failed tire pressure sensing device on the vehicle by themselves, thus greatly reducing the costs of use and maintenance.

In the present application, the defect of high cost for replacing tire pressure sensing device when replacing tire in the related art is overcome through information interaction between intelligent terminal, server (such as cloud server) and tire pressure sensing device, and the cost for replacing tire pressure sensing device is reduced, which is simple to operate and easy to promote.

In an embodiment, the present application provides a replacement method for tire pressure sensing device, where the replacement method is applied to a server and includes following steps:

step 1, querying an installation program of the tire pressure sensing device for replacement based on a request of an intelligent terminal; and sending the installation program of the tire pressure sensing device to the intelligent terminal, where the installation program of the tire pressure sensing device is used to be installed and run in the tire pressure sensing device after being sent to the tire pressure sensing device through the intelligent terminal; and step 2, querying communication association rule based on another request of the intelligent terminal, where the communication association rule is used to write an authentication information of the tire pressure sensing device into a receiver corresponding to the tire pressure sensing device on the vehicle; and sending the communication association rule to the intelligent terminal, to enable the intelligent terminal to write the authentication information into the receiver corresponding to the tire pressure sensing device on the vehicle based on the communication association rule and determine that the tire pressure sensing device is used legally.

As mentioned above, after the tire pressure sensing device completes the loading and run of the installation program of the tire pressure sensing device, the authentication information of the tire pressure sensing device is written into the receiver corresponding to the tire pressure sensing device, and the receiver completes the authentication, the replacement of the tire pressure sensing device is completed. After that, the intelligent terminal can communicate with the tire pressure sensing device to obtain the tire pressure, acceleration, temperature and other monitoring information collected by the tire pressure sensing device.

The following points should be highlighted.

First, in the embodiment of the present application, two data are obtained from the server by querying, namely the installation program of the tire pressure sensing device for replacement and the communication association rule. It should be noted that there is no chronological restriction when obtaining the two data. For example, the installation program of the tire pressure sensing device for replacement is obtained first, and then the communication association rule is obtained; or the communication association rule is obtained first, and then the installation program of the tire pressure sensing device for replacement is obtained. The present application does not limit the chronological order when obtaining the two data.

Second, this method includes two operations:

operation 3: sending the installation program of the tire pressure sensing device to the intelligent terminal, where the installation program of the tire pressure sensing device is used to be installed and run in the tire pressure sensing device after being sent to the tire pressure sensing device through the intelligent terminal; and operation 4: sending the communication association rule to the intelligent terminal, to enable the intelligent terminal to write the authentication information into the receiver corresponding to the tire pressure sensing device on the vehicle based on the communication association rule and determine that the tire pressure sensing device is used legally.

From a perspective of execution time, there is no clear order between operation 3 and operation 4. For example, the operation 3 is executed first, and then the operation 4 is executed; or the operation 4 is executed first, and then the operation 3 is executed.

It can be seen that, due to the inevitable limitation of literal description, although the operation 3 is written before the operation 4, this is not a limitation on the implementation of the present application. Whether the operation 3 is executed first or the operation 4 is executed first, it is within the protection scope of the present application.

Third, it should be noted that, in actual implementation, the following four events are executed:

querying the installation program of the tire pressure sensing device for replacement;

querying the communication association rule;

the operation 3; and the operation 4.

The execution order of the above four events is not limited in the present application, but two conditions must be satisfied:

1) before executing the operation 3, the installation program of the tire pressure sensing device for replacement of the vehicle has been obtained; and 2) before executing the operation 4, the communication association rule has been obtained.

It is not necessary to obtain the communication association rule before executing the operation 3, and it is not necessary to obtain the installation program of the tire pressure sensing device for replacement of the vehicle before executing the operation 4.

Figure 3:
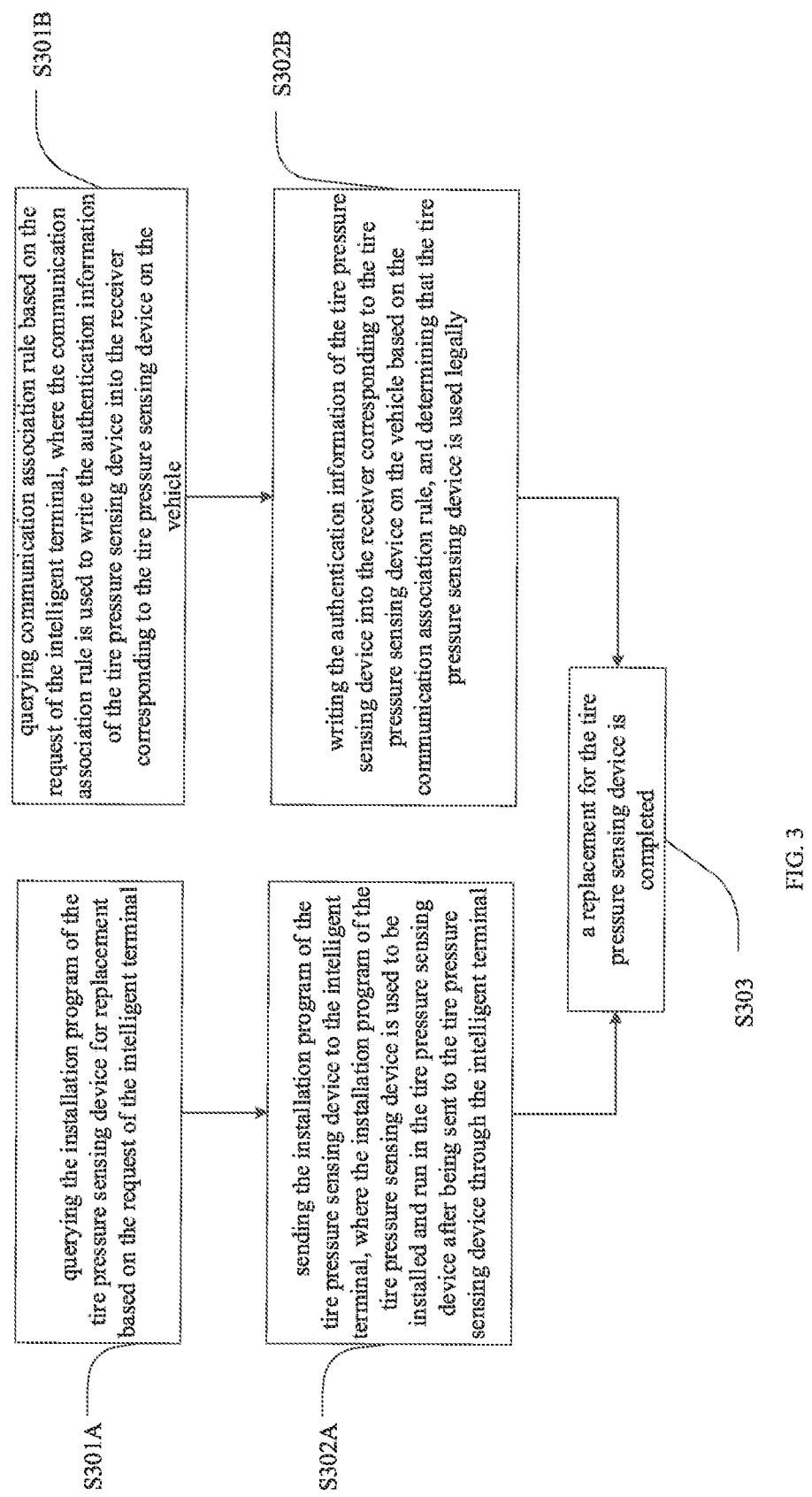
FIG. 3 is a schematic flow diagram of a replacement method for tire pressure sensing device applied to server according to an embodiment of the present application.

Referring to FIG. 3, FIG. 3 is a schematic flow diagram of a replacement method for tire pressure sensing device of the present application, where the replacement method is applied to a server and includes the following operations.

One of the operations includes step 301A and step 302A.

Step 301A, querying the installation program of the tire pressure sensing device for replacement based on the request of the intelligent terminal.

In this embodiment, the installation program of the tire pressure sensing device for replacement can be obtained by following steps:

receiving a search instruction sent by the intelligent terminal, where the search instruction corresponds to vehicle information associated with a tire pressure sensing device for replacement; and obtaining the installation program of the tire pressure sensing device matching with the search instruction from a pre-stored installation program set for a tire pressure sensing device.

Step 302A, sending the installation program of the tire pressure sensing device to the intelligent terminal, where the installation program of the tire pressure sensing device is used to be installed and run in the tire pressure sensing device after being sent to the tire pressure sensing device through the intelligent terminal.

Another of the operations includes step 301B and step 302B.

Step 301B, querying communication association rule based on the request of the intelligent terminal, where the communication association rule is used to write the authentication information of the tire pressure sensing device into the receiver corresponding to the tire pressure sensing device on the vehicle.

In an embodiment, the communication association rule can be obtained by following steps:

receiving a learning instruction sent by the intelligent terminal, where the learning instruction corresponds to the vehicle information; and determining a learning rule matching with the learning instruction in a pre-stored learning rule set, where the learning rule includes the communication association rule corresponding to the vehicle information.

In an embodiment, the communication association rule can include communication rule, communication method and access authority matching with the vehicle information.

Step 302B, sending the communication association rule to the intelligent terminal, to enable the intelligent terminal to write the authentication information into the receiver corresponding to the tire pressure sensing device on the vehicle based on the communication association rule and determine that the tire pressure sensing device is used legally.

Step 303, a replacement for the tire pressure sensing device is completed.

After step 303, the intelligent terminal can communicate with the tire pressure sensing device to obtain the tire pressure, acceleration, temperature and other monitoring information collected by the tire pressure sensing device.

It can be seen from FIG. 3 that the operation including step 301A and step 302A and the operation including step 301B and step 302B are different operations in two aspects, and there is no inevitable requirement for the execution time sequence of the operations in two aspects.

In an embodiment, obtaining the installation program of the tire pressure sensing device matching with the search instruction from a pre-stored installation program set for a tire pressure sensing device includes:

determining a code corresponding to the search instruction; and matching the code with an installation program set for a tire pressure sensing device pre-stored in special programming database to obtain the installation program of the tire pressure sensing device matching with the code based on a preset logic.

In another embodiment, obtaining the installation program of the tire pressure sensing device matching with the search instruction from a pre-stored installation program set for a tire pressure sensing device includes:

determining a code corresponding to the search instruction;

querying a plurality of installation programs associated with the code in an installation program set for a tire pressure sensing device pre-stored in special programming database; and combining the plurality of installation programs to form the installation program of the tire pressure sensing device matching with the code based on a preset logic.

In an embodiment, the learning rule can be obtained by performing the matching operation, by the server, including:

the server determines a code corresponding to the learning instruction; and matching the code with the pre-stored learning rule set to obtain the learning rule matching with the vehicle information based on a preset logic.

In an embodiment, the learning rule can be obtained by performing the combining operation, by the server, including:

the server determines a code corresponding to the learning instruction;

querying a plurality of learning rules associated with the code in the pre-stored learning rule set; and combining the plurality of learning rules to form the learning rule matching with the vehicle information based on a preset logic.

The intelligent terminal in the present application is described below. The intelligent terminal described below and the replacement method for tire pressure sensing device applied to intelligent terminal described above can be referred to each other.

Figures 4, 5, 6:
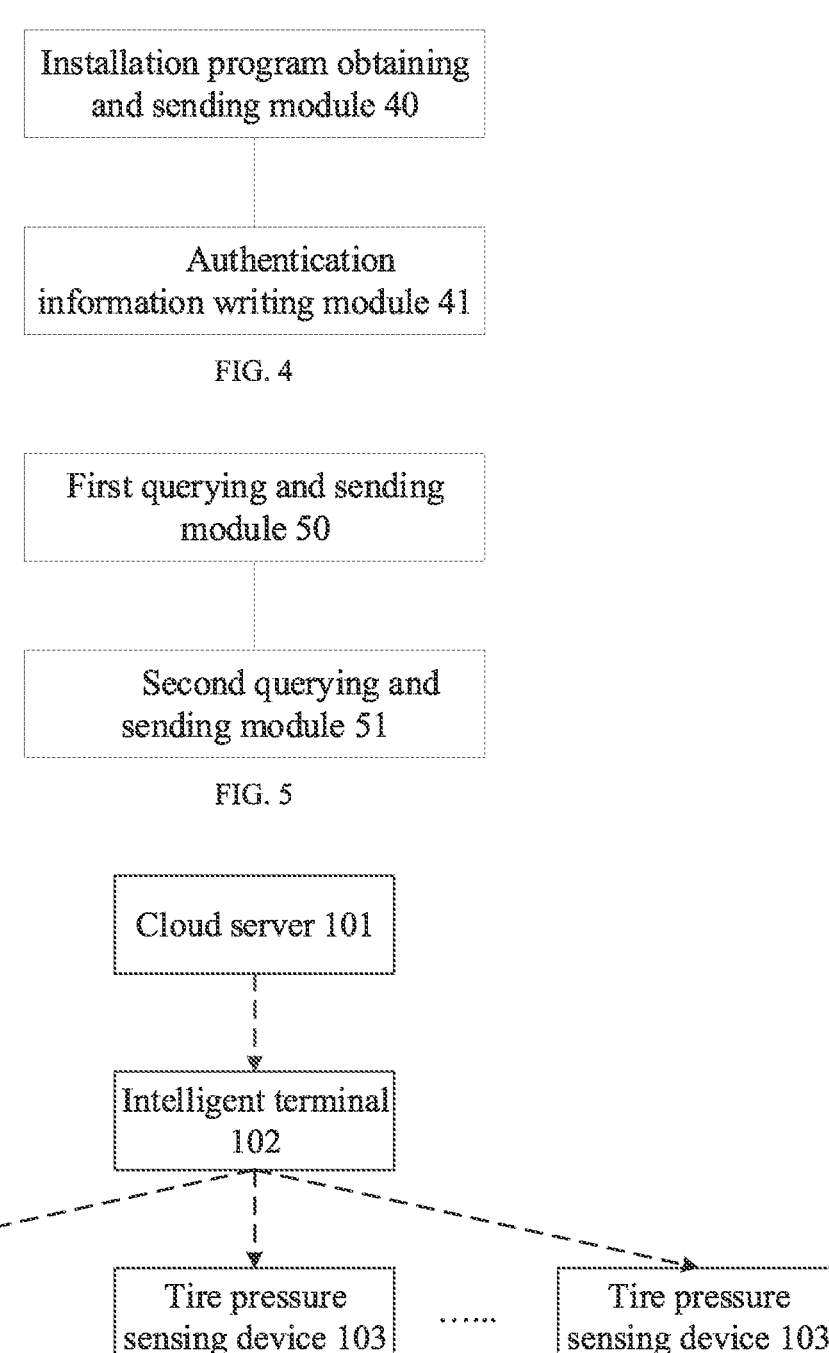
FIG. 4 is a schematic flow diagram of a replacement method for tire pressure sensing device applied to intelligent terminal according to another embodiment of the present application.
FIG. 5 is a schematic flow diagram of a replacement method for tire pressure sensing device applied to server according to another embodiment of the present application.
FIG. 6 is a topological structure block diagram of a replacement system for tire pressure sensing device according to an embodiment of the present application.

Referring to FIG. 4, FIG. 4 discloses an intelligent terminal with a replacement device for tire pressure sensing device. The intelligent terminal includes:

an installation program obtaining and sending module 40, used to request a server to obtain an installation program of a tire pressure sensing device for replacement; and send the installation program of the tire pressure sensing device to the tire pressure sensing device, where the installation program of the tire pressure sensing device is used to be installed and run in the tire pressure sensing device; and an authentication information writing module 41, used to request a communication association rule from the server, where the communication association rule is used to write an authentication information of the tire pressure sensing device into a receiver corresponding to the tire pressure sensing device on a vehicle; and write the authentication information of the tire pressure sensing device into the receiver corresponding to the tire pressure sensing device on the vehicle based on the communication association rule, and determine that the tire pressure sensing device is used legally.

The server in the present application is described below. The server described below and the replacement method for tire pressure sensing device applied to server described above can be referred to each other.

Referring to FIG. 5, FIG. 5 discloses a server with a replacement device for tire pressure sensing device. The server includes:

a first querying and sending module 50, used to query an installation program of the tire pressure sensing device for replacement based on a request of an intelligent terminal; and send the installation program of the tire pressure sensing device to the intelligent terminal, where the installation program of the tire pressure sensing device is used to be installed and run in the tire pressure sensing device after being sent to the tire pressure sensing device through the intelligent terminal; and a second querying and sending module 51, used to query communication association rule based on the request of the intelligent terminal, where the communication association rule is used to write an authentication information of the tire pressure sensing device into a receiver corresponding to the tire pressure sensing device on the vehicle; and send the communication association rule to the intelligent terminal, to enable the intelligent terminal to write the authentication information into the receiver corresponding to the tire pressure sensing device on the vehicle based on the communication association rule and determine that the tire pressure sensing device is used legally.

The present application further provides a replacement system for tire pressure sensing device. Referring to FIG. 6, the replacement system includes: an intelligent terminal 102, a server 101 and a tire pressure sensing device 103. In an embodiment, the server 101 is a cloud server.

The intelligent terminal 102 includes a processor and a memory storing computer programs, where the computer programs, when executed by the processor, cause the processor to perform the steps of the replacement method for tire pressure sensing device applied to intelligent terminal.

The cloud server 101 includes a processor and a memory storing computer programs, where the computer programs, when executed by the processor, cause the processor to perform the steps of the replacement method for tire pressure sensing device applied to server.

A plurality of tire pressure sensing devices 103 are used to run the installation program of the tire pressure sensing device.

Figure 7:
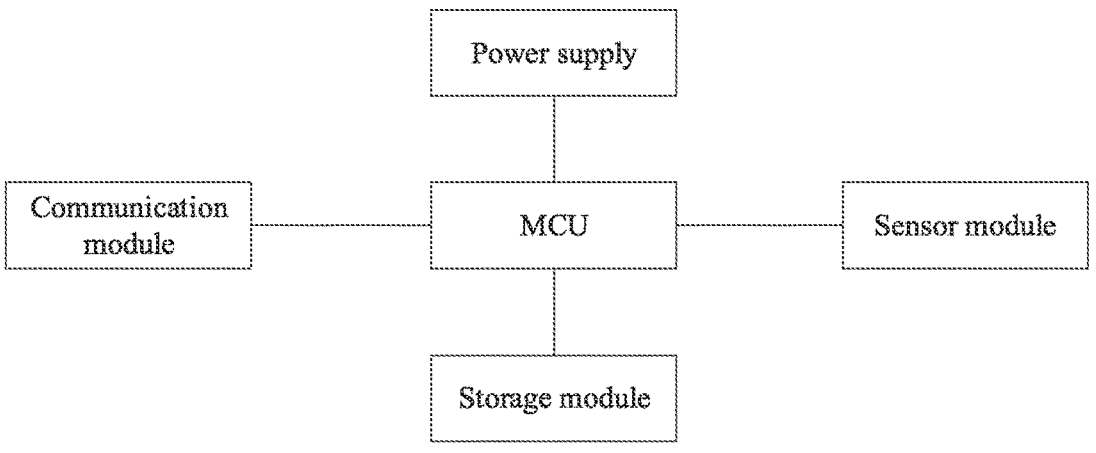
FIG. 7 is a schematic structural block diagram of a tire pressure sensing device in a replacement system for tire pressure sensing device according to an embodiment of the present application.

The structure of the tire pressure sensing device 103 can refer to the structure block diagram shown in FIG. 7, including a micro control unit (MCU), a power supply electrically connected to the MCU, a sensor module, a communication module, a power source and a storage module.

Figure 8:
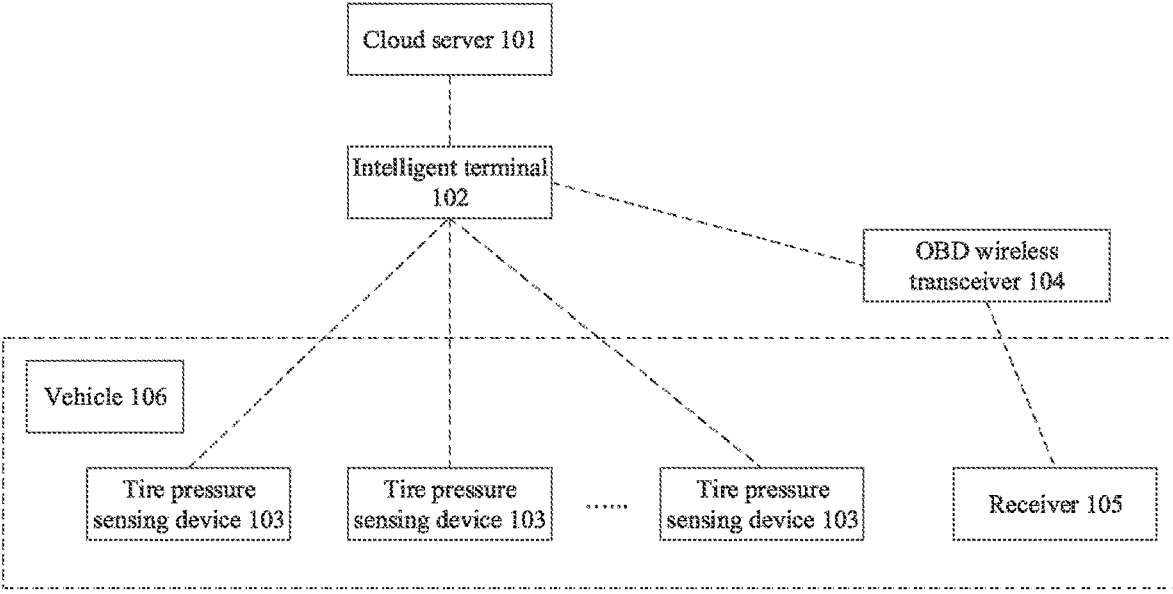
FIG. 8 is a schematic diagram of sending an authentication information to a corresponding receiver through on-board diagnostics (OBD) in a replacement system for tire pressure sensing device according to an embodiment of the present application.

In an embodiment, referring to FIG. 8, two operating modes of the system are as follows.

Scheme 1: vehicle information is selected through the intelligent terminal 102, and a search instruction corresponding to the selected vehicle information is sent to the cloud server 101; the cloud server 101 receives the search instruction, the search instruction enters a special programming database in the cloud server 101 and matches with an installation program set for a tire pressure sensing device (also called "manufacturer code") in the special programming database based on the preset logic; the cloud server 101 calls the matched installation program of the tire pressure sensing device for replacement (matched manufacturer code), and sends it to the intelligent terminal 102; and the intelligent terminal 102 receives the installation program of the tire pressure sensing device for replacement, and loads it into the tire pressure sensing device 103 by wireless, and then the tire pressure sensing device 103 runs based on the loaded installation program.

In an embodiment, the cloud server 101 matches the search instruction with an installation program set for a tire pressure sensing device includes: the cloud server 101 searches the installation program of the tire pressure sensing device (manufacturer code) corresponding to the vehicle information based on the search instruction corresponding to the vehicle information. In an embodiment, the vehicle information can include vehicle model, year of manufacture, etc.

After the intelligent terminal 102 is connected to the cloud server 101 and the tire pressure sensing device 103, the intelligent terminal 102 can obtain the tire pressure sensing device ID, location information, date and other information of the tire pressure sensing device 103, and upload them to the cloud server 101. In an embodiment, the tire pressure sensing device ID, location information and date can be referred to as "authentication information."

It should be noted that in an embodiment, the authentication information can be the tire pressure sensing device ID, but in another embodiment, the authentication information can be other information, such as tire pressure sensing device ID, location information, date and other information, or a combination of multiple information. The present application does not limit that, all the information used to enable the vehicle 106 to verify the tire pressure sensing device can be used as the authentication information.

The cloud server 101 can store various vehicle information and the corresponding installation programs of the tire pressure sensing device, and receive the tire pressure sensing device ID, location information, date, etc., uploaded by the intelligent terminal 102 for storage, analysis, and display.

The intelligent terminal 102 can be connected to the cloud server 101 and the tire pressure sensing device 103 through communication module and they can communicate with each other. The intelligent terminal 102 can be a mobile phone or a tablet computer.

The tire pressure sensing device 103 can sense the pressure, acceleration, temperature and other information of the tire through sensor module, and can be connected to the intelligent terminal by wireless through communication module to realize mutual communication. The tire pressure sensing device can further include a memory module being used to store the installation program of the tire pressure sensing device of corresponding vehicle model loaded by the intelligent terminal.

Scheme 2: vehicle information is selected through the intelligent terminal 102, and a search instruction corresponding to the selected vehicle information is sent to the cloud server 101; the cloud server 101 receives the search instruction, the cloud server 101 searches a plurality of partial installation programs related to the tire pressure sensing device in the special programming database based on the preset logic, and the cloud server 101 combines the plurality of partial installation programs to form a complete installation program of the tire pressure sensing device of a corresponding vehicle model (manufacturer code corresponding vehicle information); the cloud server 101 calls the combined installation program, and sends it to the intelligent terminal 102; and the intelligent terminal 102 receives the combined installation program of the tire pressure sensing device, and loads it into the tire pressure sensing device by wireless, and then the tire pressure sensing device runs based on the loaded installation program.

In an embodiment, the combining manner in scheme 2 refers to that the cloud server 101 searches a plurality of decentralized and partial installation programs corresponding to the search instruction based on the search instruction corresponding to the vehicle model, and combines the plurality of installation program corresponding to the search instruction to form the complete installation program of the tire pressure sensing device of corresponding vehicle information.

After the intelligent terminal 102 is connected to the cloud server 101 and the tire pressure sensing device 103, the intelligent terminal 102 can obtain the tire pressure sensing device ID, location information, date and other information of the tire pressure sensing device 103, and upload them to the cloud server with a location information of the intelligent terminal. In an embodiment, the tire pressure sensing device ID, location information and date can be referred to as "authentication information."

The cloud server 101 can store various vehicle information and the corresponding installation programs of the tire pressure sensing device, and receive the tire pressure sensing device ID, location information, date, and the like uploaded by the intelligent terminal 102 for storage, analysis, and display.

The intelligent terminal 102 can be connected to the cloud server 101 and the tire pressure sensing device 103 through communication module and they can communicate with each other. The intelligent terminal 102 can be a mobile phone or a tablet computer.

The tire pressure sensing device 103 can sense the pressure, acceleration, temperature and other information of the tire through sensor module, and can be connected to the intelligent terminal by wireless through communication module to realize mutual communication. The tire pressure sensing device can further include a memory module being used to store the installation program of the tire pressure sensing device of corresponding vehicle model loaded by the intelligent terminal.

The process of programming the tire pressure sensor and whole vehicle learning is as follows:

after running the installation program in the tire pressure sensing device 103 by using scheme 1 or scheme 2, vehicle information is selected through the intelligent terminal 102, and then a learning instruction related to the selected vehicle information is sent to the cloud server 101. The cloud server 101 matches the learning instruction and the learning rule (learning code) in the special learning database based on the preset logic, calls the matched learning rule and sends it to the intelligent terminal 102.

In an embodiment, the learning rule is obtained by performing the matching operation, by the server, in the pre-stored learning rule set based on the learning instruction, and the learning rule includes the communication association rule matching with the vehicle information.

The intelligent terminal 102 receives the learning rule and writes the previously obtained authentication information including the obtained tire pressure sensing device ID, date, location, etc., into the receiver corresponding to the tire pressure sensing device on the vehicle via the OBD wireless transceiver 104 by wireless based on the communication association rule in the learning rule, so that the vehicle can obtain the status data monitored by the tire pressure sensing device.

In an embodiment, when the authentication information is written into the receiver corresponding to the tire pressure sensing device on the vehicle via the OBD wireless transceiver 104 by wireless, the used interface/instruction can come from the wireless receiver 105, the intelligent terminal 102 and the cloud server 101. In addition, the intelligent terminal 102 can analyze, store and display the tire related parameters written into the vehicle.

Figure 9:
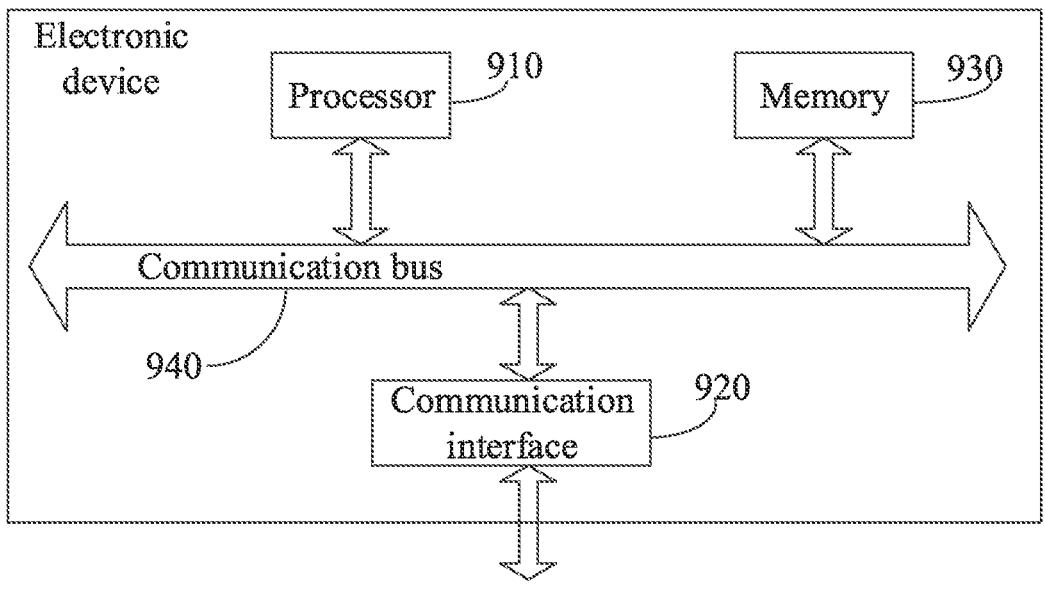
FIG. 9 is a schematic structural diagram of an electronic equipment according to an embodiment of the present application.

FIG. 9 shows the physical structure of an electronic device. As shown in FIG. 9, the electronic device can include: a processor 910, a communication interface 920, a memory 930 and a communication bus 940. The processor 910, communication interface 920 and memory 930 communicate with each other through the communication bus 940. The processor 910 can call the logic instructions in the memory 930 to execute the replacement method for tire pressure sensing device applied to intelligent terminal or server.

When the logic instructions in the memory 930 are implemented in the form of software functional unit and sold or used as an independent product, it can be stored in a computer readable storage medium. Based on such understanding, the solutions of the present application in essence or the part of the solutions that contributes to the related art or part of the solutions can be embodied in the form of a software product, and the computer software product is stored in a storage medium and includes several instructions to cause a computer device (which can be a personal computer, a server, or a network device or the like) to perform all or part of the steps of the methods described in the various embodiments of the present application. The foregoing storage medium includes: USB flash memory, removable hard disk, read-only memory (ROM), random access memory (RAM), magnetic disk or optical disk and other mediums that can store program codes.

An embodiment of the present application provides a computer program product. The computer program product includes computer programs. The computer programs can be stored on a non-transient computer-readable storage medium. When the computer programs are executed by a processor, the computer can execute the replacement method for tire pressure sensing device applied to intelligent terminal or server based on the above embodiments.

An embodiment of the present application provides a non-transient computer readable storage medium, storing computer programs, where the computer programs, when executed by a processor, cause the processor to perform the replacement method for tire pressure sensing device applied to intelligent terminal or server based on the above embodiments.

The device embodiments described above are only schematic, where the units described as separate components may be or may not be physically separated, and the components shown as units may be or may not be physical units, that is, they may be located in one place, or they may be distributed to multiple network units. Some or all of the modules can be selected based on the actual needs to achieve the purpose of the solution of the present application. A person skilled in the art can understand and implement the present application without creative efforts.

Through the description for the above embodiments, those skilled in the art can clearly understand that each embodiment can be realized by means of software and necessary general hardware platform, and of course, it can also be realized by means of hardware. Based on such understanding, the above solutions in essence or the part of the solutions that contributes to the related art can be embodied in the form of a software product, and the computer software product can be stored in a computer readable storage medium, such as ROM/RAM, magnetic disk, optical disk, etc. The computer readable storage medium includes several instructions to cause a computer device (which can be a personal computer, a server, or a network device or the like) to perform the methods described in various embodiments or in a part of the embodiment.

It should be noted that the above embodiments are only used to illustrate the solution of the present application, not to limit it. Although the present application has been described in detail with reference to the preceding embodiments, those skilled in the art can modify the solutions recorded in the preceding embodiments or make replacement for some features equally, these modifications or replacements do not make the essence of the corresponding solutions depart from the scope of the solutions of the present application.

What is claimed is:

1. A programming method for a tire pressure sensing device, comprising:

requesting a server to obtain an installation program of a tire pressure sensing device for replacement; and sending the installation program of the tire pressure sensing device to the tire pressure sensing device, wherein the installation program of the tire pressure sensing device is used to be installed and run in the tire pressure sensing device;

wherein the installation program of the tire pressure sensing device for replacement is obtained by the following steps:

sending a search instruction to the server, wherein the search instruction corresponds to vehicle information associated with the tire pressure sensing device for replacement;

receiving the installation program of the tire pressure sensing device sent by the server, wherein the installation program of the tire pressure sensing device is obtained by performing a matching or combining operation, by the server, in a pre-stored installation program set for a tire pressure sensing device based on the search instruction; and wherein the installation program of the tire pressure sensing device being obtained by performing the matching operation, by the server, in the pre-stored installation program set for a tire pressure sensing device based on the search instruction comprises:

determining, by the server, a code corresponding to the search instruction; and matching the code with an installation program set for a tire pressure sensing device that is pre-stored in special programming database based on a preset logic, and obtaining the installation program of the tire pressure sensing device matching with the vehicle information; or wherein the installation program of the tire pressure sensing device being obtained by performing the combining operation, by the server, in the pre-stored installation program set for a tire pressure sensing device based on the search instruction comprises:

determining, by the server, a code corresponding to the search instruction;

querying a plurality of installation programs associated with the code in an installation program set for a tire pressure sensing device pre-stored in special programming database; and combining the plurality of installation programs based on a preset logic to form the installation program of the tire pressure sensing device matching with the vehicle information.

2. A programming method for a tire pressure sensing device, comprising:

querying an installation program of a tire pressure sensing device for replacement for a vehicle based on a request of an intelligent terminal; and sending the installation program of the tire pressure sensing device to the intelligent terminal, wherein the installation program of the tire pressure sensing device is used to be installed and run in the tire pressure sensing device after being sent to the tire pressure sensing device through the intelligent terminal;

wherein the installation program of the tire pressure sensing device for replacement is obtained by following steps:

receiving a search instruction sent by the intelligent terminal, wherein the search instruction corresponds to vehicle information associated with the tire pressure sensing device for replacement; and obtaining the installation program of the tire pressure sensing device matching with the search instruction from a pre-stored installation program set for a tire pressure sensing device;

wherein the obtaining the installation program of the tire pressure sensing device matching with the search instruction from the pre-stored installation program set for a tire pressure sensing device comprises:

determining a code corresponding to the search instruction; and matching the code with an installation program set for a tire pressure sensing device pre-stored in special programming database based on a preset logic, and obtaining the installation program of the tire pressure sensing device matching with the code; or wherein the obtaining the installation program of the tire pressure sensing device matching with the search instruction from the pre-stored installation program set for a tire pressure sensing device comprises:

determining a code corresponding to the search instruction;

querying a plurality of installation programs associated with the code in an installation program set for a tire pressure sensing device pre-stored in special programming database; and combining the plurality of installation programs based on a preset logic to form the installation program of the tire pressure sensing device matching with the code.

3. A replacement method for a tire pressure sensing device, comprising:

requesting an installation program of a tire pressure sensing device for replacement from a server;

sending the installation program of the tire pressure sensing device to the tire pressure sensing device, wherein the installation program of the tire pressure sensing device is used to be installed and run in the tire pressure sensing device; and requesting a communication association rule from the server, wherein the communication association rule is used to write an authentication information of the tire pressure sensing device into a receiver corresponding to the tire pressure sensing device on a vehicle; and writing the authentication information of the tire pressure sensing device into the receiver corresponding to the tire pressure sensing device on the vehicle based on the communication association rule, and determining that the tire pressure sensing device is used legally;

wherein the communication association rule is obtained by following steps:

sending a learning instruction to the server, wherein the learning instruction corresponds to the vehicle information; and receiving a learning rule sent by the server, wherein the learning rule is obtained by performing a matching or combining operation, by the server, in a pre-stored learning rule set based on the learning instruction, and the learning rule comprises the communication association rule matching with the vehicle information.

4. The method according to claim 3, wherein the installation program of the tire pressure sensing device for replacement is obtained by following steps:

sending a search instruction to the server, wherein the search instruction corresponds to vehicle information associated with the tire pressure sensing device for replacement;

receiving the installation program of the tire pressure sensing device sent by the server, wherein the installation program of the tire pressure sensing device is obtained by performing a matching or combining operation, by the server, in a pre-stored installation program set for a tire pressure sensing device based on the search instruction.

5. The method according to claim 4, wherein the installation program of the tire pressure sensing device being obtained by performing a matching or combining operation, by the server, in the pre-stored installation program set for a tire pressure sensing device based on the search instruction comprises:

determining, by the server, a code corresponding to the search instruction; and matching the code with an installation program set for a tire pressure sensing device pre-stored in special programming database based on a preset logic, and obtaining the installation program of the tire pressure sensing device matching with the vehicle information;

wherein the installation program of the tire pressure sensing device is obtained by performing the combining operation, by the server, in the pre-stored installation program set for a tire pressure sensing device based on the search instruction comprises:

determining, by the server, a code corresponding to the search instruction;

querying a plurality of installation programs associated with the code in an installation program set for a tire pressure sensing device pre-stored in special programming database; and combining the plurality of installation programs based on a preset logic to form the installation program of the tire pressure sensing device matching with the vehicle information;

wherein the sending the installation program of the tire pressure sensing device to the tire pressure sensing device comprises:

sending the installation program of the tire pressure sensing device to the tire pressure sensing device by wireless.

6. The method according to claim 3, wherein the writing the authentication information of the tire pressure sensing device into the receiver corresponding to the tire pressure sensing device on the vehicle based on the communication association rule comprises:

writing the authentication information comprising an identifier of the tire pressure sensing device into the receiver corresponding to the tire pressure sensing device on the vehicle based on the communication association rule.

7. The method according to claim 6, wherein the communication association rule comprises a communication rule, communication method and access authority matching with the vehicle information;

wherein the writing the authentication information comprising the identifier of the tire pressure sensing device into the receiver corresponding to the tire pressure sensing device on the vehicle comprises:

writing the authentication information into the receiver corresponding to the tire pressure sensing device on the vehicle through OBD wireless transceiver by wireless.

8. The method according to claim 3, wherein the obtaining of the learning rule by performing the matching operation comprises:

determining, by the server, a code corresponding to the learning instruction; and matching the code with the pre-stored learning rule set based on a preset logic and obtaining the learning rule matching with the vehicle information;

wherein the learning rule is obtained by performing a combining operation comprises:

determining, by the server, a code corresponding to the learning instruction;

querying a plurality of learning rules associated with the code in the pre-stored learning rule set; and combining the plurality of learning rules to form the learning rule matching with the vehicle information based on a preset logic.

9. A replacement method for a tire pressure sensing device, comprising:

querying an installation program of a tire pressure sensing device for replacement based on a request of an intelligent terminal; and sending the installation program of the tire pressure sensing device to the intelligent terminal, wherein the installation program of the tire pressure sensing device is used to be installed and run in the tire pressure sensing device after being sent to the tire pressure sensing device through the intelligent terminal; and querying communication association rule based on the request of the intelligent terminal, wherein the communication association rule is used to write an authentication information of the tire pressure sensing device into a receiver corresponding to the tire pressure sensing device on the vehicle; and sending the communication association rule to the intelligent terminal, to enable the intelligent terminal to write the authentication information into the receiver corresponding to the tire pressure sensing device on the vehicle based on the communication association rule and determine that the tire pressure sensing device is used legally;

wherein the communication association rule is obtained by following steps:

receiving a learning instruction sent by the intelligent terminal, wherein the learning instruction corresponds to the vehicle information; and obtaining a learning rule matching with the learning instruction from a pre-stored learning rule set by performing a matching or combining operation, wherein the learning rule comprises the communication association rule corresponding to the vehicle information.

10. The method according to claim 9, wherein the installation program of the tire pressure sensing device for replacement is obtained by following steps:

receiving a search instruction sent by the intelligent terminal, wherein the search instruction corresponds to vehicle information associated with the tire pressure sensing device for replacement; and obtaining the installation program of the tire pressure sensing device matching with the search instruction from a pre-stored installation program set for a tire pressure sensing device.

11. The method according to claim 10, wherein the obtaining the installation program of the tire pressure sensing device matching with the search instruction from a pre-stored installation program set for a tire pressure sensing device comprises:

determining a code corresponding to the search instruction; and matching the code with an installation program set for a tire pressure sensing device pre-stored in special programming database based on a preset logic, and obtaining the installation program of the tire pressure sensing device matching with the code.

12. The method according to claim 11, wherein the obtaining the installation program of the tire pressure sensing device matching with the search instruction from the pre-stored installation program set for a tire pressure sensing device comprises:

determining a code corresponding to the search instruction;

querying a plurality of installation programs associated with the code in an installation program set for a tire pressure sensing device pre-stored in special programming database; and combining the plurality of installation programs based on a preset logic to form the installation program of the tire pressure sensing device matching with the code.

13. The method according to claim 9, wherein the communication association rule comprises communication rule, communication method and access authority matching with the vehicle information;

wherein the obtaining of the learning rule by performing the matching operation comprising:

determining, by the server, a code corresponding to the learning instruction; and matching the code with the pre-stored learning rule set based on a preset logic and obtaining the learning rule matching with the vehicle information;

wherein the obtaining of the learning rule by performing the combining operation comprising:

determining, by the server, a code corresponding to the learning instruction;

querying a plurality of learning rules associated with the code in the pre-stored learning rule set; and combining the plurality of learning rules to form the learning rule matching with the vehicle information based on a preset logic.

* * * * *